UNITED STATES PATENT OFFICE.

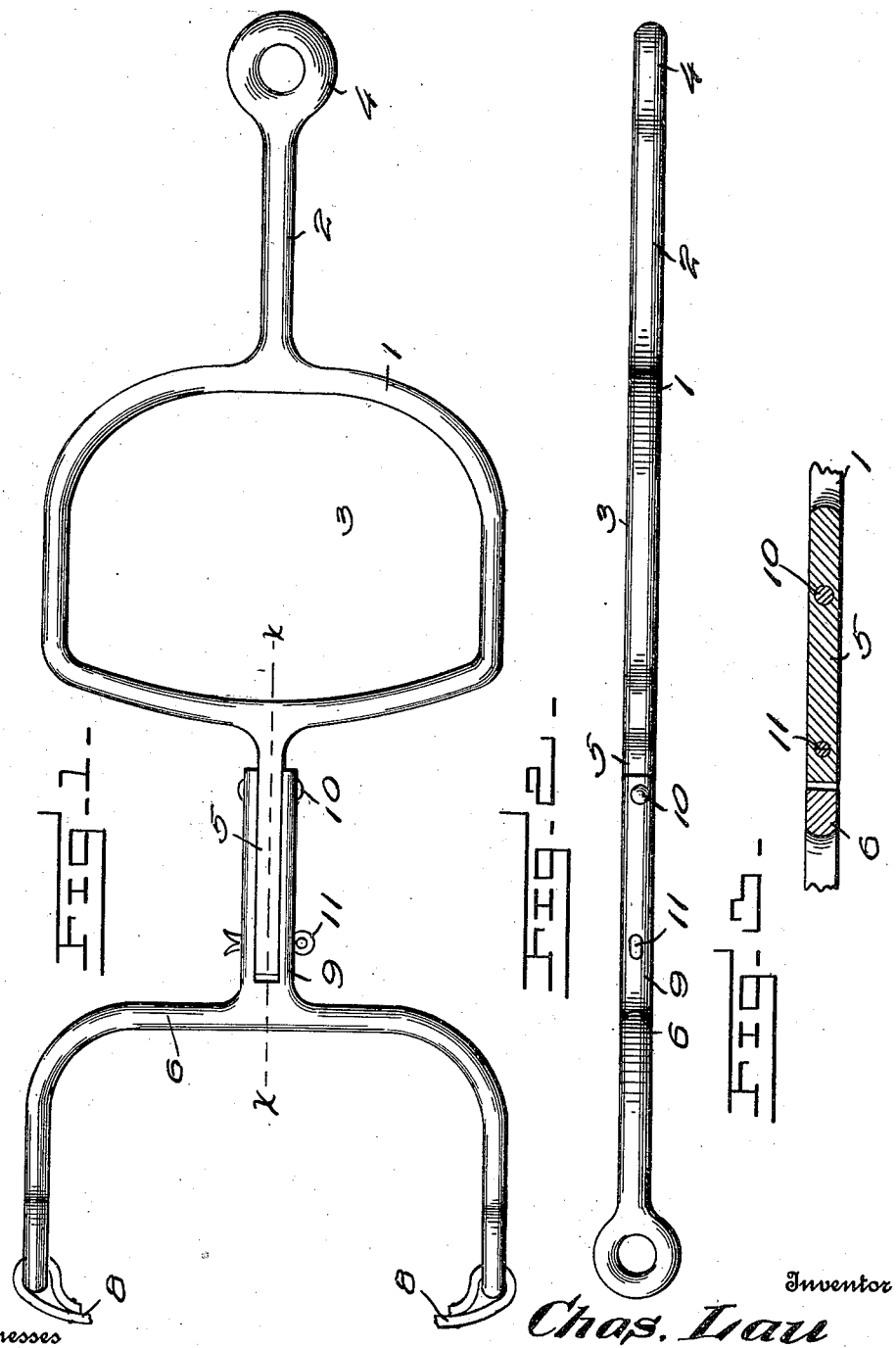

CHARLES LAU, OF CHICAGO, ILLINOIS, ASSIGNOR TO FRANK VORDA, OF CHICAGO, ILLINOIS.

HORSE-GAG.

1,006,959.     Specification of Letters Patent.     Patented Oct. 24, 1911.

Original application filed May 11, 1909, Serial No. 495,241. Divided and this application filed September 24, 1910. Serial No. 583,680.

*To all whom it may concern:*

Be it known that I, CHARLES LAU, a citizen of the United States, residing at Chicago, in the county of Cook and State of Illinois, have invented certain new and useful Improvements in Horse-Gags, of which the following is a specification.

This invention relates to certain new and useful improvements in horse gags, and is a division from an application filed by me May 11, 1909, Ser. No. 495,241, and patented Jan. 17, 1911, No. 982,075.

The object of this invention is to provide a light, inexpensive and simply constructed horse gag, arranged to be placed in the mouth of a horse or similar animal to be properly adjusted resulting in the animal being compelled to open its jaws.

Briefly stated the invention consists of a simple, practical and effective device of the character described and composed of two hingedly connected sections, one of which is adapted to embrace the jaw of the animal and the other constructed to be forced in contact with the roof of the animal's mouth whereby the device may be easily applied, for the purpose stated.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts of the several views, Figure 1 shows a front view of a one-piece horse gag embodying my invention. Fig. 2 is an edge view thereof. Fig. 3 is a longitudinal section of the hinged portion of the device taken on the line *x—x* of Fig. 1.

In dosing horses with medicine, as well as when the teeth of the animal require filling, filing, extracting, or the like, it is quite necessary to hold the animal's jaws apart in a firm position.

Referring to the drawings 1 represents a rectangular shaped lower jaw loop having a centrally positioned stem 2 of sufficient length for holding and properly manipulating the section 3 of the device the end of said stem terminating in a loop or ring 4.

Forming an integral part of the jaw loop 3 and projecting therefrom substantially on a plane with the stem 2, is an extension 5 which is also centrally positioned with respect to the loop and is adapted to form one member of a hinged connection as will hereinafter more fully appear.

The U-shaped roof member is provided with terminal looped ends to which are attached the opposite ends of a tie strap 8, whereby the gag may be securely strapped about the animal's upper jaw, and forming an integral part of said member and projecting centrally therefrom is a forked extension 9 which freely receives extension 5 of the lower jaw member 3, through which extensions a pivot pin 10 is passed for hingedly connecting the sections.

In order to hold the sections 3 and 6 of the gag in a rigid position in respect to one another, a cotter 11 is passed through suitable openings formed for its reception in the connected extensions 5 and 9 at a suitable distance from the pivotal connections of said extensions, whereby the gag may be folded within the animal's mouth by removing the cotter.

In practice, the instrument is inserted within the animal's mouth with the roof member in contact with the upper jaw of the animal, after which the lower rectangular shaped member 3 is passed over the lower jaw of the animal with the tongue under the same, and by forcing said members on a line with one another, the animal will be compelled to open its mouth, and as long as the sections are on a line with one another, the jaws of the animal are held apart. When dental or scientific operations are necessary, the tie strap is buckled around the head of the animal so that the instrument will be firmly secured in position. The hingedly connected portions of the sections will be located in the center of the animal's mouth when the instrument is properly adjusted, and therefore the animal can be conveniently dosed, or the teeth can be easily extracted.

Having thus described my invention, what I claim as new and desire to secure by Letters Patent is:

A gag comprising a looped section, a stem forming a part of the same, an extension also forming a part of the looped section, a U-shaped section, a forked extension forming a part of the same, a pivot pin passing through said extension whereby the said sections are hingedly connected, and a cotter removably passed through suitable openings formed in said extensions as and for the purpose described.

In testimony whereof I affix my signature, in the presence of two witnesses.

CHARLES LAU.

Witnesses:
H. B. KOLLER,
FRANK VORDA.

Copies of this patent may be obtained for five cents each, by addressing the "Commissioner of Patents, Washington, D. C."